(12) United States Patent
Cruz

(10) Patent No.: US 6,434,842 B1
(45) Date of Patent: Aug. 20, 2002

(54) RASPING LEVEL

(75) Inventor: Michael R. Cruz, Riverside, CA (US)

(73) Assignee: Rasping Level Technology Inc., Riverside, CA (US)

( * ) Notice: Subject to any disclaimer, the term of this patent is extended or adjusted under 35 U.S.C. 154(b) by 122 days.

(21) Appl. No.: 09/639,297

(22) Filed: Aug. 13, 2000

(51) Int. Cl.[7] .............................. B25B 29/00; B25F 1/00
(52) U.S. Cl. ................................ 33/334; 33/365; 7/164
(58) Field of Search .......................... 33/347, 354, 365, 33/370–371, 377, 379, 451, 483–484, 493, 528, DIG. 10, 333, 334; 7/105, 164, 169, 170

(56) References Cited

U.S. PATENT DOCUMENTS

| | | | | |
|---|---|---|---|---|
| 317,188 A | * | 5/1885 | Pederson | 33/483 |
| 3,859,002 A | * | 1/1975 | Sauey | 33/370 |
| 3,975,868 A | * | 8/1976 | Botimer | 451/490 |
| 4,463,501 A | | 8/1984 | Wright et al. | |
| 4,559,714 A | | 12/1985 | Wright | |
| 4,571,845 A | | 2/1986 | Wright et al. | |
| 4,581,828 A | | 4/1986 | Handler et al. | |
| 4,593,475 A | * | 6/1986 | Mayes | 33/347 |
| 4,685,219 A | | 8/1987 | Haefner et al. | |
| 4,860,459 A | | 8/1989 | Dengler | |
| 4,862,595 A | | 9/1989 | Drumright | |
| 4,979,310 A | | 12/1990 | Wright | |
| 5,033,199 A | | 7/1991 | Wilcox et al. | |
| 5,036,627 A | * | 8/1991 | Walters | 451/354 |
| 5,063,679 A | * | 11/1991 | Schwandt | 33/347 |
| 5,279,041 A | | 1/1994 | Wright | |
| 5,406,714 A | | 4/1995 | Baker et al. | |
| 5,531,031 A | * | 7/1996 | Green | 33/281 |
| 5,588,217 A | | 12/1996 | Lindner et al. | |
| 5,588,904 A | * | 12/1996 | Allport | 451/512 |
| 5,718,622 A | * | 2/1998 | Jones | 451/523 |
| 5,944,586 A | * | 8/1999 | Sevigny et al. | 451/359 |
| 6,027,399 A | * | 2/2000 | Stewart | 451/353 |
| 6,209,214 B1 | * | 4/2001 | Talavera | 33/528 |
| 6,213,857 B1 | * | 4/2001 | Duquette | 451/513 |
| 6,253,454 B1 | * | 7/2001 | Gietzen | 15/236.08 |
| 6,261,031 B1 | * | 7/2001 | Stipe et al. | 451/523 |
| 6,296,558 B1 | * | 10/2001 | Poole et al. | 451/515 |

\* cited by examiner

*Primary Examiner*—Diego Gutierrez
*Assistant Examiner*—Yaritza Guadalupe
(74) *Attorney, Agent, or Firm*—Roberta M. Fay

(57) ABSTRACT

The invention is a new building tool for leveling a flat surface while removing irregularities in the surface by sanding. The tool, named a "rasping level," integrates into one instrument the functions of leveling and sanding a surface. The rasping level consists of a frame, levels positioned on the top surface of the frame, and sandpaper on the under surface (second surface) of the frame. Along the lengthwise edges of the top surface of the frame are "grippers" for holding and manipulating the tool. The frame and grippers are made of light weight but rigid material. The levels may be typical spirit levels that are used to measure the level and plumb of wall surfaces. Heavy grit sandpaper covers the under surface of the frame. The sandpaper is attached to the under surface of the frame by aerosol adhesive or semipermanent liquid adhesive. Worn-out sandpaper can be removed and replaced by fresh sandpaper as needed.

13 Claims, 2 Drawing Sheets

RASPING LEVEL

FIELD OF THE INVENTION

This invention relates to measuring and sanding instruments and, more particularly, to a tool for measuring level and plumb and for sanding surface areas; the tool is for use by builders, plasterers, carpenters, masons, and the like.

BACKGROUND OF THE INVENTION

For well over a century various kinds of levels have been used during wall and floor construction. Typical line levels consist of tube-like vials with an inner cavity partially filled with a clear liquid that does not freeze at the lowest expected temperature at which the level will be used. With the vial partially filled, a bubble is visible and the relation of the position of the bubble with respect to reference lines on or around the vial shows whether the surface of the wall is level or plumb.

The leveling instrument in U.S. Pat. No. 5,279,041 (Wright) describes a measuring instrument provided with vials for determining level or pitch relationships and a graduated straight edge for measuring linear distance. Another patent for a composite level is U.S. Pat. No. 4,979,310 (Wright). That instrument consists of an I-shaped aluminum frame having ribbed or working surfaces, a pair of one-piece plastic cover plates integrally formed with end plates secured to the frame, and a plurality of measuring levels supported by the frame and retained by the cover plates.

One area in which plasterers regularly use levels is the installation of exterior walls. Over the last 25 to 30 years, various specialized techniques have been developed for exterior wall coverings of new and remodeled buildings. One of those techniques is the EIFS (Exterior Insulation Finishing System), which consists in applying prefabricated EIFS panels to new construction and to retrofit existing commercial, institutional, and residential buildings.

The components of EIFS typically involve (1) an insulation board; (2) an attachment of the insulation board to the substrate or existing wall surface; (3) a base coat reinforced with glass mesh on the face of the insulation board; and (4) a finish coat in a variety of colors and textures designed to protect the entire system. The actual material of the EIFS is expanded polystyrene (EPS), a light weight, resilient, foamed plastic compound that can be molded to meet specific application requirements.

When the EPS is laid onto an exterior wall, extensive sanding and leveling operations must be performed over the entire wall surface. The individual operations of sanding and leveling can be extremely tedious and time-consuming. Close attention to detail is required in taking the level measurements while, at the same time, long sweeping motions are needed in the sanding. Both prefabricated EIFS panels and field-applied EIFS panels require these combined activities. In addition, extra care and attention are needed at caulk joints and at wall and floor edges. Any tool that would improve the process and technique for sanding and taking level measurements would be beneficial.

GENERAL DESCRIPTION

The invention is a new building tool for leveling a flat surface while removing irregularities in the surface by sanding. The tool, named a "rasping level," integrates into one building tool the functions of leveling and sanding a surface.

The rasping level consists of a frame, levels positioned on a first opposing surface of the frame, and sandpaper on a second opposing surface of the frame. Positioned along the first opposing surface (the topside) of the frame are "grippers" for holding and physically manipulating the tool. The frame and grippers can vary in length, and both are made of rigid, light weight material. The levels may be typical spirit levels that are used to measure the level and plumb of wall surfaces.

Sandpaper covers the second opposing surface (the underside) of the frame. The sandpaper can be high grit or heavy grit, or any other kind of suitable grit for foam, wood, floors, or walls. The sandpaper is attached to the second opposing surface of the frame by an aerosol adhesive or a semipermanent liquid adhesive. A spray adhesive may provide the easiest and most flexible method for bonding the sandpaper to the frame. After continuous use or whenever necessary, the user can easily remove and replace the sandpaper. Advantages of the invention include the following:

(1) One operation can be used to both sand and simultaneously check the level of the surface being sanded.
(2) The rasping level is faster than a hand trowel for sanding large surface areas of a sidewall, and the rasping level covers a substantially larger area in one fell swoop.
(3) New sandpaper can easily replace worn-out sandpaper.
(4) Different weights or qualities of sandpaper can be placed on the rasping level for different sanding requirements.
(5) The rasping level is faster, more efficient, more effective, simpler, and easier to use than a combination of the hand trowel and separate hand level measurement checks.
(6) The rasping level is less taxing and less arduous to use than separate tools; the human body is not as physically strained and stressed during the sanding/leveling operation. (This advantage is separate from the improvement in speed of the operation.)

Objectives of the invention include the following:

The primary objective of the invention is to create a device for builders that combines leveling and sanding into one integrated operation.

Another objective is to provide a leveling/sanding tool that can be readily maintained by changing the sandpaper as needed.

Another objective is to eliminate the need for handling several tools at the same time or in sequence in order to sand and to check that the surface of the wall under construction is level and plumb.

Another objective is to provide builders with a simple instrument that is structurally sound and efficient and that contains few movable parts.

Another objective is to provide a tool that is easy to use and easy to transport and store with other building tools.

Another objective is to devise a tool that is economical to manufacture and reasonable in cost for the plasterer who uses it.

Another objective is to provide a consistently accurate tool for the plasterer over an extended period of time with little expense for upkeep.

BRIEF DESCRIPTION OF THE DRAWINGS

Similar reference characters denote corresponding features consistently throughout the attached drawings. The figures are not drawn to scale.

DETAILED DESCRIPTION OF THE INVENTION

Figure 1:
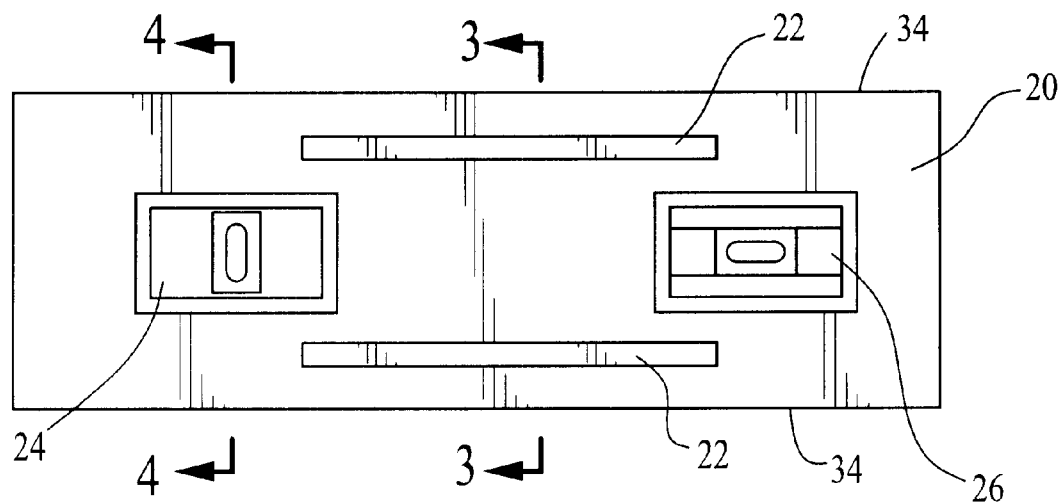
FIG. 1 shows a top plan view of the first opposing surface of the apparatus.

Referring to FIGS. 1 through 4, the invention comprises a frame 20 with grippers 22 and levels 24 and 26 on the first opposing surface 28 of the frame and with sandpaper 30 on the second opposing surface 32 of the frame.

The frame is composed of rigid material, which is not flexible or bendable, and which is light weight (approximately one to three lbs.). The material may be hard plastic, light weight stainless steel, light weight aluminum, wood, or a metal composite. The preferred length of the frame is four feet, but the length can vary from two to six feet. The preferred width of the frame is four inches, but the width can vary from two to six inches. The preferred height of the frame is ½ inch, but the height can vary from approximately ⅛ inch to one inch.

On the first opposing surface and on the second opposing surface there are two lengthwise edges 34. The two edges are a first lengthwise edge and a second lengthwise edge.

The grippers 22 are positioned along the first opposing surface of the frame for holding and physically manipulating the tool. There are two grippers, a first gripper and a second gripper. The first gripper is mounted in proximity to the first lengthwise edge on the first opposing surface of the frame, and the second gripper is mounted in proximity to the second lengthwise edge on the first opposing surface of the frame. The grippers are positioned approximately ⅛ to two inches from each lengthwise edge 34 of the frame, as shown in FIG. 1 (the top view). Preferably, the length of the grippers is less than the length of the frame. In the preferred embodiment, shown in FIGS. 1 through 4, the grippers are approximately eight inches long, ¼ inch wide, and one inch in height, and they are positioned ½ inch from each lengthwise edge of the frame. The acceptable ranges are a length of six inches to four feet, a width of ¹⁄₁₆ inch to one inch, and a height of ½ inch to two inches.

Figure 5:
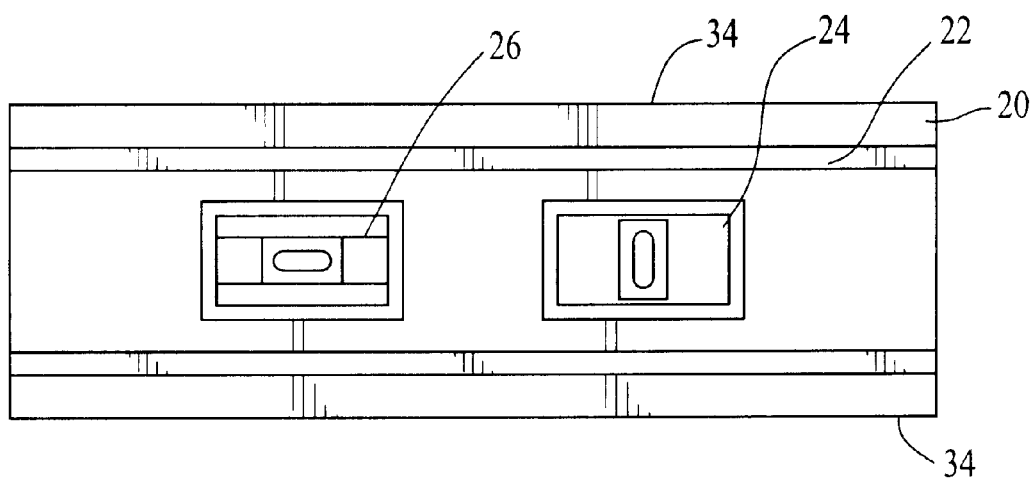
FIG. 5 shows a top plan view of a second embodiment of the apparatus similar to that shown in FIG. 1. (This second embodiment has grippers abutting against the two corresponding lengthwise edges of the first opposing surface of the frame.)
Figure 2:
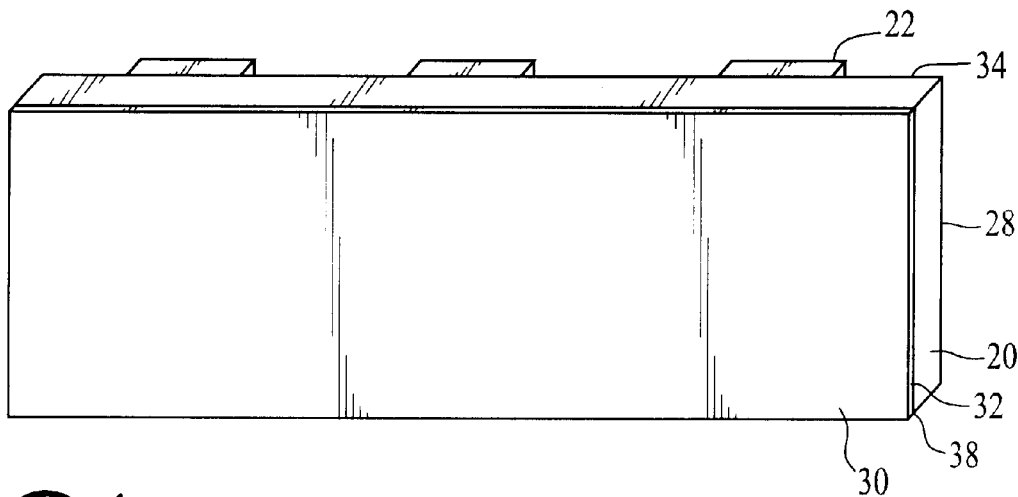
FIG. 2 shows a perspective view of the second opposing surface of the apparatus.

FIG. 5 shows an alternative embodiment wherein the length of the grippers 22 matches the length of the frame 20. Then the grippers are positioned in proximity to the entire first and second lengthwise edges 34 of the first opposing surface of the frame. The width and height dimensions remain the same in range and ideal measurements (as in FIGS. 1 through 4 discussed above). In the preferred embodiment, the grippers lay in proximity to the lengthwise edges, that is, approximately ½ inch from the edge.

In another alternative embodiment, the grippers may abut against the corresponding lengthwise edges of the frame. In such an alternative embodiment, the first gripper would be positioned adjacent to the first lengthwise edge and the second gripper would be positioned adjacent to the second lengthwise edge of the first opposing surface of the frame.

Figure 3:
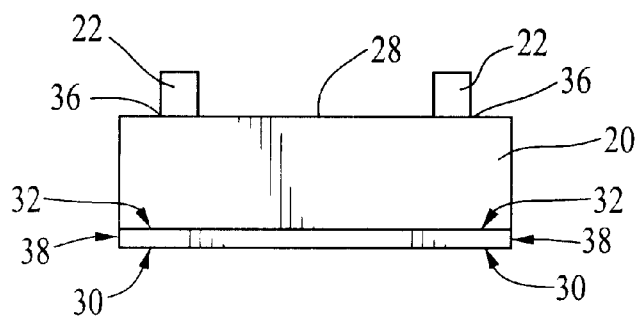
FIG. 3 shows a cross sectional view of the apparatus with the grippers shown.
Figure 4:
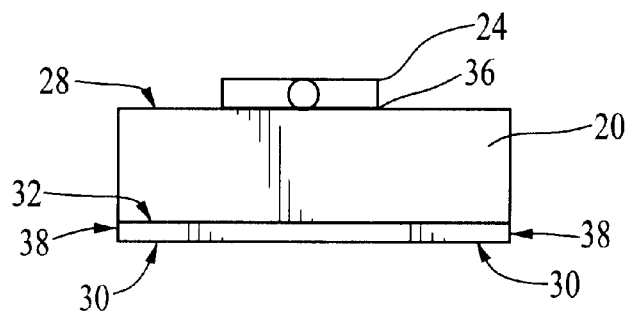
FIG. 4 shows a cross sectional view of the apparatus with the level positioned in the center of the frame.

Generally, the grippers may be made of the same material as the frame, or the grippers may be made of a suitable alternative material that is rigid and light weight. The grippers are attached through use of an epoxy; the epoxy layer 36 is shown in FIG. 3. In the preferred embodiment, the epoxy matches the epoxy used for attaching the levels (discussed later in this section). However, other similar and suitable epoxy compositions may be substituted. In other alternative embodiments, the grippers are attached through a mechanical fastening means, such as a drilled hole/nail/bolt mechanism. In still other alternative embodiments, the grippers may be aluminum welded onto the frame through a standard commercially available arc-welding process.

Along the first opposing surface of the frame, between the grippers, levels are permanently positioned. The levels can be mounted anywhere along the frame, as long as they are at least one foot apart and can be easily read with both eyes at a quick glance. The preferred embodiment of the invention involves at least two levels, one vertical level 24 and a second horizontal level 26.

The vertical level is used to determine if the wall surface is plumb while the horizontal level is used to determine if the wall surface is level. For this invention, the vial material of the level may be virtually any kind of transparent glass or plastic; any material typically used for commercially available levels is suitable. The liquid composition may also be any one of a range of liquids that are typically used in commercially available levels. A vial that is not tapered will be more sensitive than a tapered vial. Depending on the particular application, a tapered vial may or may not be used.

The preferred level has a length of 1½ inches and diameter of ⅜ inch. However, the dimensions can vary substantially—to practically any range that will fit onto the frame. Typical line levels may vary from a length of one inch to four inches and a diameter of ¼ inch to one inch.

In other alternative embodiments, up to three or four levels can be positioned on the top surface of the frame, and the levels can be horizontal, vertical, or with a 45 degree bubble structure, or any suitable combination of levels. Furthermore, in another alternative embodiment, a single horizontal level or a single vertical level may be used.

The levels are attached to the first opposing surface of the frame, and they cannot be removed, detached, or replaced. In the preferred embodiment, the attachment means is an epoxy. However, alternative attachment means such as a mechanical fastener or clamp may be used. A conventional mechanical fastener means such as a drilled hole/nail/bolt/nut combination can also be used.

For the preferred embodiment, the horizontal level can be attached with the following procedural steps:

1. Place the assembly on a working surface (not shown in the FIGS.) known to be level.
2. Put the frame down on the working surface so that the first opposing surface of the frame is exposed and the second opposing surface is protected.
3. Put the epoxy on the suitable position on the first opposing surface of the frame and on the corresponding suitable position on the back surface of the level vial.
4. Press the two corresponding frame and vial surfaces together.
5. Before the epoxy is cured, adjust the level so that the bubble displayed indicates that the surface is level.
6. Upon complete curing, an epoxy layer 36 exists between the level and first opposing surface 28 of the frame.

Likewise, for the preferred embodiment, the vertical level can be attached with the following procedural steps:

1. Put the frame on a surface known to be vertical (90 degrees to the floor).
2. Clamp down the frame if desired.

3. Put the epoxy on the suitable position on the first opposing surface of the frame and on the corresponding suitable position on the back surface of the level vial.
4. Press the two corresponding frame and vial surfaces together.
5. Before the epoxy is cured, adjust the level so that the bubble displayed indicates that the surface is plumb.
6. Upon complete curing, an epoxy layer 36 exists between the level and first opposing surface 28 of the frame.

The level may be any commercial line level with or without a plastic holding cover attached to the outer vial. The epoxy may be any suitable epoxy that is flexible enough to withstand temperature extremes. The epoxy must also have an impact strength suitable for a construction environment. In contrast, rubber contact cement, flexible silicon glue, and hot glue are not suitable as an attachment means.

Sandpaper 30 comprises a grit surface and a back surface. The back surface is in contact with the second opposing surface 32 (the underside) of the frame. The sandpaper can be high grit or heavy grit, or any other kind of suitable grit for foam, wood, floors, or walls. The length of the sandpaper is the same as the length of the frame; the width of the sandpaper matches the width of the frame.

The sandpaper is attached to the second opposing surface of the frame by the use of an adhesive. Preferably, the adhesive is an aerosol adhesive that is commercially available. The aerosol adhesive is applied to the back surface of the sandpaper and afterwards the back surface is attached to the second opposing surface of the frame. An adhesive layer 38 is formed between the sandpaper and the second opposing surface of the frame.

In alternative embodiments, a suitable liquid adhesive can be used; virtually any liquid adhesive that is semipermanent and capable of attaching heavy paper to metal materials can be used for this tool.

Because the adhesive is an aerosol adhesive or a semi-permanent liquid adhesive, in both preferred and alternative embodiments, the user can easily replenish the sanding grit by removing worn-out sandpaper and attaching unused sandpaper to the second opposing surface of the frame. (The unused sandpaper is new, fresh sandpaper that has a heavy grit, coarse sandpaper composition which may be identical to or similar to the original sandpaper composition.) Since the user himself can remove and replace the sandpaper, the cost and inconvenience of replacement by a manufacturer are eliminated. The sandpaper is replaceable usually after 15 to 20 hours of continuous use, approximately three to five days of regular, systematic use.

For the preferred embodiment, the sandpaper may be attached to the second opposing surface of the frame with the following procedural steps:
1. Place the frame on a working surface, so that the second opposing surface is available for use/manipulation and the first opposing surface is protected. (The first opposing surface containing the levels and grippers must be covered and kept away from any possible spray.)
2. Remove any old, used sandpaper and then remove any other surface debris from the second opposing surface of the frame. The removal operation can be done with any suitable sharp-edged knife or serrated instrument.
3. Wipe off any remaining surface debris with a dry cloth.
4. Spray the adhesive evenly and completely across the back surface of the sandpaper.
5. Wait approximately 30 seconds to 5 minutes for the adhesive spray to become tacky. (The adhesive is tacky when the material is somewhat sticky to the touch and not completely dry. The adhesive is in a tacky condition when the volatile constituents have evaporated or been absorbed sufficiently to leave it in a desired tacky state.)
6. Place the back surface of the sandpaper (containing the adhesive layer) on the second opposing surface of the frame so that the back surface of the sandpaper is in physical contact with the entire surface area of the second opposing surface of the frame.
7. Apply hand pressure on the grit surface of the sandpaper and along the entire length of the second opposing surface of the frame. The hand pressure is applied so that good uniform physical contact is made across the entire second opposing surface of the frame.

EXTRA EMBODIMENTS

As mentioned above, this tool may have several possible configurations. The number of levels can vary from one to four, and the levels can be vertical, horizontal, at a 45 degree angle, or a suitable combination. The grippers can be variable in length, or the two grippers can be as long as the entire first opposing surface of the frame, as shown in FIG. 5. In another alternative embodiment, a single gripper may be used (in place of two grippers.) The grippers can be mechanically fastened to the first opposing surface of the frame, as well as fastened through the use of a suitable epoxy. The levels can also be mechanically fastened to the first opposing surface of the frame instead of fastened by using an epoxy.

Another additional embodiment involves placing straight-edge markings along the edge of the first opposing surface of the frame. Such markings could be used to measure either horizontal or vertical length along the wall surface that is being sanded and measured for level and plumb.

Commercially available products may be used in the process of making this tool. The invention is not limited to any specific products. In all cases, generic products or other commercially available products may be substituted.

While special mention has been made of the commercial EIFS process, this invention may be used generally in the construction, carpentry, and masonry industries. In its commercial embodiment, the present invention will be made available in a variety of sizes, shapes, and materials to accommodate different applications. Also, the present invention is not limited to the embodiments described above, but encompasses any and all embodiments within the scope of the claims.

What is claimed is:
1. An apparatus for sanding and leveling areas, the apparatus comprising:
   a. a frame comprising a first opposing surface and a second opposing surface, and with a first and a second lengthwise edge on the first opposing surface of the frame;
   b. at least one level mounted on the first opposing surface;
   c. a first gripper and a second gripper, the first gripper mounted in proximity to the first lengthwise edge on the first opposing surface of the frame and the second gripper mounted in proximity to the second lengthwise edge on the first opposing surface of the frame;
   d. sandpaper; and
   e. means for connecting the sandpaper to the second opposing surface of the frame.
2. The apparatus for sanding and leveling areas as recited in claim 1, wherein:
   a. the connecting means comprises an aerosol adhesive.
3. The apparatus for sanding and leveling areas as recited in claim 2, wherein:

a. the sandpaper comprises a grit surface and a back surface; and b. the adhesive is applied to the back surface of the sandpaper and afterwards the back surface is attached to the second opposing surface of the frame.

4. The apparatus for sanding and leveling areas as recited in claim 1, wherein the apparatus comprises:

a. a plurality of levels on the first opposing surface.

5. The apparatus for sanding and leveling areas as recited in claim 4, wherein the apparatus comprises;

a. at least one horizontal level; and b. at least one vertical level.

6. The apparatus for sanding and leveling areas as recited in claim 1, wherein:

a. the frame has a length and the first and second grippers have a length, the length of the grippers less than the length of the frame.

7. The apparatus for sanding and leveling areas as recited in claim 1, wherein:

a. the frame has a length and the first and second grippers have a length, the length of the grippers equivalent to the length of the frame;

b. the first gripper is positioned in proximity to the entire first lengthwise edge of the first opposing surface of the frame; and c. the second gripper is positioned in proximity to the entire second lengthwise edge of the first opposing surface of the frame.

8. The apparatus for sanding and leveling areas as recited in claim 1, wherein:

a. the first gripper is mounted adjacent to the fast lengthwise edge of the first opposing surface of the frame; and b. the second gripper is mounted adjacent to the second lengthwise edge of the first opposing surface of the frame.

9. The apparatus for sanding and leveling areas as recited in claim 1, wherein:

a. the sandpaper comprises a heavy grit, coarse sandpaper composition; and b. the sandpaper is replaceable.

10. A method for producing an apparatus for sanding and leveling areas, the steps comprising:

a. positioning a frame with a first opposing surface and a second opposing surface so that the first opposing surface is exposed and the second opposing surface is protected;

b. mounting a first gripper and a second gripper on the first opposing surface of the frame;

c. mounting at least one level on the first opposing surface of the frame;

d. positioning the frame so that the second opposing surface of the frame is exposed and the first opposing surface of the frame is protected;

e. removing any debris and residue from the second opposing surface of the frame;

f. obtaining a heavy grit sandpaper comprising a grit surface and a back surface;

g. spray coating as aerosol spray adhesive onto the back surface of the sandpaper;

h. waiting a time period sufficiently long that the adhesive becomes tacky on the back sur face of the sandpaper;

i. placing the back surface of the sandpaper directly on the second opposing surface of the frame; and j. applying hand pressure uniformly across the grit surface of the sandpaper.

11. The method for producing an apparatus for sanding and leveling areas as recited in claim 10, the steps further comprising:

a. after continuous use, removing the sand paper from the second opposing surface of the frame;

b. further removing any debris and residue from the second opposing surface of the frame;

c. obtaining an unused heavy grit sandpaper comprising a grit surface and a back surface;

d. spray coating an aerosol spray adhesive onto the back surface of the unused sandpaper;

e. waiting a time period sufficiently long that the adhesive becomes tacky on the back surface of the unused sandpaper;

f. placing the back surface of the unused sandpaper directly on the second opposing surface of the frame; and g. applying hand pressure uniformly across the grit surface of the unused sandpaper.

12. The method for producing an apparatus for sanding and leveling areas as recited in claim 10, wherein:

a. the time period for the adhesive to become tacky on the back surface of the sandpaper consists of a time period of 30 seconds to 5 minutes.

13. An apparatus for sanding and measuring level, the apparatus comprising:

a. a frame with a first opposing surface and a second opposing surface;

b. at least one level mounted on the first opposing surface;

c. at least one gripper mounted on the first opposing surface; and d. sandpaper attached to the second opposing surface.

* * * * *

UNITED STATES PATENT AND TRADEMARK OFFICE
CERTIFICATE OF CORRECTION

PATENT NO. : 6,434,842 B1
DATED : August 20, 2002
INVENTOR(S) : Cruz

It is certified that error appears in the above-identified patent and that said Letters Patent is hereby corrected as shown below:

Column 7,
Line 10, delete "comprises;" and insert in place thereof -- comprises: --.
Line 33, delete "fast" and insert in place thereof -- first --.

Column 8,
Line 9, delete "as" and insert in place thereof -- an --.
Line 12, delete "sur face" and insert in place thereof -- surface --.
Line 21, delete "sand paper" and insert in place thereof -- sandpaper --.

Signed and Sealed this

Twenty-sixth Day of November, 2002

*Attest:*

*Attesting Officer*

JAMES E. ROGAN
*Director of the United States Patent and Trademark Office*